Sept. 3, 1940.  A. BOUWERS ET AL  2,213,199
VOLTAGE MULTIPLIER
Filed May 25, 1938
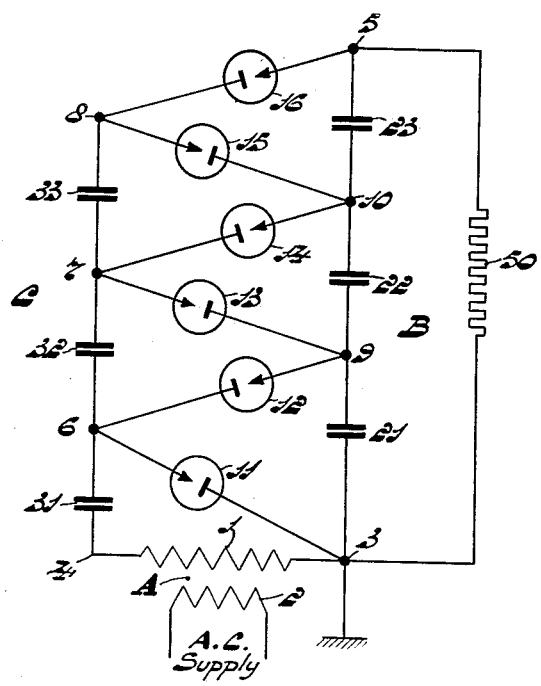
INVENTORS
ALBERT BOUWERS
and ALFRED KUNTKE
by
ATTORNEY Patented Sept. 3, 1940

2,213,199

UNITED STATES PATENT OFFICE 2,213,199

VOLTAGE MULTIPLIER

Albert Bouwers, Eindhoven, Netherlands, and Alfred Kuntke, Hamburg, Germany, assignors, by mesne assignments, to Hartford National Bank and Trust Company, Hartford, Conn., as trustee Application May 25, 1938, Serial No. 210,072
In Germany May 28, 1937

4 Claims.   (Cl. 175—363)

Our invention relates to voltage multipliers comprising an arrangement of condensers and rectifiers which converts an alternating voltage into a unidirectional voltage of higher value.

As has been described in the U. S. Patent 1,974,328 to Albert Bouwers, the rectifiers of such devices may be connected in series and the condenser may be connected one across each two successive rectifiers. The first rectifier of the series is connected across the series connection of an A. C. supply and one of the condensers, which latter condenser, referred to hereinafter as the "first" condenser, is connected in series with the condenser connected across the second and third rectifiers. Thus, the device comprises two groups of condensers connected in series and the number of condensers is equal to the number of rectifiers.

The main object of our invention is to reduce the voltage losses within such devices, and for this purpose we use condensers of different capacities. Another object of our invention is to reduce the cost of a voltage multiplier of the kind referred to by properly selecting the capacities of the condensers. More particularly, we use condensers which, as taken from the A. C. supply end of the device toward the high-voltage end, have decreasing capacities. The capacities may decrease stepwise, or only some of the condensers may be of lower capacity than the "first" condenser.

In order that the invention may be clearly understood and readily carried into effect, we shall describe the same in more detail with reference to the accompanying drawing in which the single figure is a schematic diagram of a voltage multiplier embodying the invention.

The voltage multiplier shown in the drawing comprises a transformer A having a secondary winding 1, and a primary winding 2 connected to a suitable A. C. supply. The device comprises six rectifiers 11, 12, 13, 14, 15 and 16, which may be either dry rectifiers or thermionic valves, connected in series between a point 5 and a ground point 3 connected to one end of winding 1. Connected in series between points 3 and 5 is a group B of three condensers 21, 22 and 23, each of which is connected across two adjacent rectifiers. A second group C consists of three condensers 31, 32 and 33, which are connected in series between a point 4 connected to the other end of winding 1, and a point 8 between rectifiers 15 and 16. A suitable load 50, shown as a resistance, is connected across points 3 and 5.

With the condensers in a charged condition, a terminal voltage of about 6E volts exists across points 3 and 5; E being the peak value of the no-load voltage of transformer A. There is a voltage of 5E volts across points 4 and 8, and a voltage which fluctuates between 4E and 6E, depending upon the frequency of the A. C. supply, across points 3 and 8.

If a current $i$ flows through load 50, a voltage drop will be produced within the device due to a partial discharge of the condensers, and this voltage drop becomes smaller as the capacities of the condensers and frequency of the A. C. supply become higher. More particularly, in each cycle of the alternating current, condenser 23 loses a charge $$\frac{i}{f}$$

$f$ being the frequency of the A. C. supply. This causes a reduction $$\frac{i}{fC_{23}}$$

in the terminal voltage across points 3 and 5; $C_{23}$ being the capacity of condenser 23. In the next half-wave of the cycle in which point 8 is positive with respect to point 5, the loss of charge in condenser 23 is supplied again by condenser 33, which latter condenser is charged in turn by condenser 22. Condenser 22 consequently delivers the charge $$\frac{i}{f}$$

two times in one cycle, i. e. the first time because of the decrease in current between points 3 and 5 and the second time for charging condenser 33. In one cycle, condenser 21 delivers a still greater charge, viz. a charge $$3\frac{i}{f}$$

Consequently, the voltage drop in the condensers located in the neighbourhood of the transformer is greater than that in the condensers remote from the transformer.

To ensure that, for given values of current intensity and frequency of the A. C. supply, a given loss of voltage is not surpassed, the capacities of the condensers must have minimum values which are in a certain relation to these given values.

In accordance with the invention, the capacities of the condensers are given different values, i. e. so that from transformer A towards the higher voltage end, the capacities of the condensers decrease step-wise. There are always at least two capacity steps, and, if desired, only the first condenser possesses a higher capacity than the other condenser.

The capacity may also be graduated in any desired number of steps, and in some instances each of the condensers connected in series with each other may have a capacity which is smaller than that of the preceding condenser. For example, if the total number of condensers equals $2n$ and the capacity of the first condenser equals K, the capacity of the last condenser may be $2n$ times as small as that of the first condenser, i. e. equal to $$\frac{K}{2n}$$

and the capacities of intermediate condensers may be in steps. For instance if C represents the condensers in one group and C' represents the condensers in the second group, the capacities of the condensers $$C_n, C'_{n-1}, C_{n-1}, C'_{n-2} \text{ etc. } \ldots C' \text{ and } C_1$$

respectively will be equal to the values $$\frac{K}{2}, \frac{K}{3}, \frac{K}{4}, \frac{K}{5}, \text{ etc., } \ldots \frac{K}{2n-1} \text{ and } \frac{K}{2n}$$

respectively. More specifically, if in the figure the first condenser 31 has a capacity K, the last condenser 23 may have a capacity $$\frac{K}{6}$$

and the intermediate condensers 21, 32, 22 and 33 may have capacities of $$\frac{K}{2}, \frac{K}{3}, \frac{K}{4} \text{ and } \frac{K}{5}$$

respectively.

Other divisions are possible, for example, one in which condensers 21, 22 and 23 have the same capacities as condensers 31, 32 and 33 respectively, and the capacities of condensers 21 or 31 are 6 times as large as that of condensers 23 or 33 respectively.

The advantage of using condensers of stepped capacity resides in that, for a given loss of voltage, the condensers on the whole may be smaller. More particularly, $n$ condensers each having a capacity C and a loss of voltage V with a current intensity $i$, are together larger and more expensive than $n$ condensers whose capacities decrease in one or more steps and which are so dimensioned that the loss of voltage is also V. Although in the latter case the first condenser is larger than the condensers used in the first case, the remaining condensers, or at least some of them, are smaller.

The degree of graduation to be provided for depends on the requirements to be met. For example, the capacities may be so selected that the same loss of voltage is produced in each condenser. However, in some cases it is desirable to have the smallest possible total capacity of the condensers or a small content of energy of the series-connection (small series capacity). In any case the desired degree of graduation may be calculated by starting with the delivery of charge by the condensers and by determining the voltage drop of each condenser during its partial discharge as a function of the capacities; this voltage drop being dependent on the delivery of charge.

If, on the other hand, it is desired to decrease the loss of voltage, the capacities of all the condensers are not increased or increased to the same extent, but the capacity of the condensers of the lower voltage stages is first increased. For example, if the capacity of condenser 21 is doubled the loss of voltage is decreased about 20.4%. If, however, the capacity of the $n$th condenser of a group having $n$ condensers, i. e. condenser 33 of group C, is doubled instead of the first condenser of the group, i. e. condenser 31, this would result in a decrease of the loss of voltage of only about 2.3%. The doubling of the capacity of the condenser 31 consequently has an effect which is nine $(n^2)$ times as great as the effect of the doubling of the capacity of condenser 33.

While we have described the invention with reference to specific examples and application, we do not wish to be limited thereto but desire the appended claims to be construed as broadly as is permissible in view of the prior art.

What we claim is:

1. A voltage multiplier comprising a first condenser, a supply of alternating current, a plurality of rectifiers connected in series and including a first rectifier connected across the series connection of said first condenser and supply, and a plurality of condensers connected one across each two successive rectifiers, the first condenser having a higher capacity than any of the remaining condensers.

2. A voltage multiplier comprising a first condenser, a supply of alternating current, a plurality of rectifiers connected in series and including a first rectifier connected across the series connection of said first condenser and supply, and a plurality of condensers connected one across each two successive rectifiers, the capacities of said latter condensers decreasing stepwise from the alternating current supply.

3. A voltage multiplier comprising a first condenser having a capacity K, a supply of alternating current, a plurality of rectifiers connected in series and including a first rectifier connected across the series connection of the first condenser and supply, and a condenser connected across each two successive rectifiers, the capacities of the condensers starting with the first condenser being equal to the values $$K, \frac{K}{2}, \frac{K}{3}, \ldots \frac{K}{2n-1} \text{ and } \frac{K}{2n}$$

respectively in which $n$ is the total number of condensers.

4. An installation for producing high rectified voltages comprising a plurality of rectifiers connected in series, a source of alternating current and a condenser connected in series across the first rectifier, a plurality of condensers connected one across each two successive rectifiers, said latter condensers being arranged in two series-connected groups, the condensers of one of said groups having capacities which decrease stepwise from the alternating current supply.

ALBERT BOUWERS.
ALFRED KUNTKE.